United States Patent [19]

Seidenberger

[11] 4,011,098

[45] Mar. 8, 1977

[54] SPILL CONTROL COMPOSITION AND USE THEREOF

[75] Inventor: James W. Seidenberger, Bethlehem, Pa.

[73] Assignee: J. T. Baker Chemical Company, Phillipsburg, N.J.

[22] Filed: Oct. 22, 1975

[21] Appl. No.: 624,592

[52] U.S. Cl. .................. 134/6; 252/440; 252/443; 252/191

[51] Int. Cl.² ............. B08B 7/00; B01J 27/20; C09K 3/00

[58] Field of Search .......... 252/440, 443, DIG. 11, 252/88, 191, 84, 156; 134/4, 6

[56] References Cited

UNITED STATES PATENTS

| | | | |
|---|---|---|---|
| 701,995 | 6/1902 | Burgess | 252/440 X |
| 1,993,761 | 3/1935 | Tippins | 252/440 X |
| 3,198,748 | 8/1965 | Keith et al. | 252/443 |
| 3,664,352 | 5/1972 | Norman et al. | 252/443 X |
| 3,865,924 | 2/1975 | Gidaspow et al. | 252/443 X |

FOREIGN PATENTS OR APPLICATIONS

| | | | |
|---|---|---|---|
| 222,423 | 9/1924 | United Kingdom | 252/443 |

*Primary Examiner*—Partick P. Garvin
*Assistant Examiner*—William G. Wright
*Attorney, Agent, or Firm*—George W. Rauchfuss, Jr.; Eugene O. Retter

[57] ABSTRACT

A spill of a compound providing cyanide ion is cleaned up by mixing with the spilled cyanide compound a composition containing a powdered ferrous sulfate and an alkali or alkaline earth metal carbonate.

8 Claims, No Drawings

SPILL CONTROL COMPOSITION AND USE THEREOF

FIELD OF THE INVENTION

The present invention relates to a composition for cleaning up spilled cyanide compounds.

BACKGROUND OF THE INVENTION

The toxicity of cyanides is such that the compounds should not be allowed to contaminate air and water. Spilled cyanides are often the source of poisoning because they produce hydrogen cyanide in acidic conditions.

Therefore, there is a need for a composition of matter for taking up spilled cyanides at a relatively fast and safe rate and at a cost that is not prohibitively expensive.

SUMMARY OF THE INVENTION

It has now been found that a powdered composition composed of ferrous sulfate and an alkali or alkaline earth metal carbonate is especially used for complexation and subsequent cleanup of spilled cyanide compounds.

DETAILED DESCRIPTION OF INVENTION

The composition useful for the purpose of this invention is composed of about 78 to 82% by weight of a powdered ferrous sulfate and about 18 to 22% by weight of an alkali or alkaline earth metal carbonate.

The powdered ferrous sulfate is preferably of a particle size such that about 95% passes through a U.S. No. 200 sieve. The metal carbonate powder is preferably of a particle size such that 95% passes through a U.S. No. 50 sieve.

As examples of alkali or alkaline earth metal carbonates that may be employed in this invention, there may be mentioned, for example, sodium carbonate, potassium carbonate, lithium carbonate, calcium carbonate and magnesium carbonate. Generally preferred are the water soluble carbonates and most preferred is sodium carbonate.

A preferred composition of the invention may be defined as comprising:

A. 80 parts ± 5% powdered ferrous sulfate of a particle size that about 95% passes through a U.S. No. 200 sieve.

B. 20 parts ± 5% alkali metal or alkaline earth metal carbonate, preferably sodium carbonate, of a particle size that about 95% passes through a U.S. No. 50 sieve, wherein the parts are expressed as parts by weight.

An especially preferred composition comprises one having 80 parts powdered ferrous sulfate and 20 parts of powdered carbonate, preferably sodium carbonate, wherein the parts are parts by weight and the particle sizes are as hereinbefore set forth.

The composition of this invention is first activated by the addition and mixing at least about 350 ml of water, preferably 350 to 500 ml, to about 125 grams of the composition before placing the resulting solution or paste over the cyanide spill.

A spill of a cyanide compound can be controlled and cleaned up by pouring an activated composition of this invention on the spill surface and pushing the resulting paste or solution across the area of the spill, such as by use of a brush or wooden spatula. A sponge moistened with an activated water-soluble composition of this invention may be used for treating vertical surfaces having spilled cyanide thereon. After the spilled cyanide has been treated for about 5 minutes by being in the presence of the activated composition of this invention, a suitable absorbing agent such as sawdust or the like is applied to the spill and the resulting paste is collected by any suitable scoop and placed into any suitable waste disposal container and disposed of in accordance with any applicable environmental disposal regulations.

From the foregoing it will be seen that a composition and method have been provided which will eliminate quickly and easily the hazard to persons working under conditions due to spillage of a cyanide.

It will be understood that the embodiments discussed herein and the use for the embodiments are merely illustrative of my invention and that one skilled in the art can make suitable modifications thereof without departing from the spirit and intent of the invention.

What is claimed is:

1. A composition useful for the control and cleanup of a cyanide spill comprising 78 to 82% by weight of powdered ferrous sulfate, and 18 to 22% by weight of an alkali or alkaline earth metal carbonate.

2. The composition of claim 1 wherein the powdered ferrous sulfate is of a particle size such that about 95% passes through a U.S. No. 200 sieve and the carbonate is of a particle size such that about 95% passes through a U.S. No. 50 sieve.

3. The composition of claim 2 wherein the metal carbonate is sodium carbonate.

4. The composition of claim 3 comprising 80 parts by weight ferrous sulfate and 20 parts by weight sodium carbonate.

5. The composition of claim 1 activated for use in the control and cleanup of a spilled cyanide comprising additionally from about 350 to 500 ml of water per 125 grams of the mixture of ferrous sulfate and alkali or alkaline earth metal carbonate.

6. The composition of claim 4 activated for use in the control and cleanup of a spilled cyanide comprising additionally from about 350 to 500 ml of water per 125 grams of the mixture of ferrous sulfate and sodium carbonate.

7. A method for the control and cleanup of a spilled cyanide comprising contacting said spilled cyanide with a composition of claim 5.

8. A method for the control and cleanup of a spilled cyanide comprising contacting said spilled cyanide with a composition of claim 6.

* * * * *